Figures 1, 2, 3:
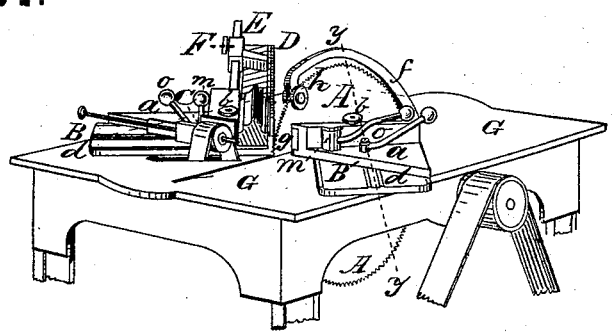

W. E. EASTMAN.
MITER-MACHINE.

No. 184,704. Patented Nov. 28, 1876.

Witnesses:
Robert Fletcher
J. O. Stanton

Inventor:
W. E. Eastman
per M. L. Baxter
Atty.

UNITED STATES PATENT OFFICE.

WILLIAM E. EASTMAN, OF DERBY, VERMONT, ASSIGNOR TO MYRON LESLIE BAXTER, OF AURORA, ILLINOIS.

IMPROVEMENT IN MITER-MACHINES.

Specification forming part of Letters Patent No. 184,704, dated November 28, 1876; application filed August 14, 1876.

*To all whom it may concern:*

Be it known that I, WILLIAM EVERARD EASTMAN, of Derby, in the county of Orleans and State of Vermont, have invented certain new and useful Improvements in Miter-Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a perspective view of that part of a machine embodying my invention. Fig. 2 is a vertical longitudinal section of one of the clamping devices, the plane of section being indicated by the line $y\ y$, Fig. 1. Fig. 3 is a side elevation of the saw and saw-guide, and a portion of the frame of the machine to which said saw-guide is secured.

The object of this invention is twofold—to wit, to secure excellence in the work produced, and at the same time to greatly cheapen the cost of production.

It consists of the following-described parts, some of which I do not claim as new, except in combination with the others.

A in the drawing represents a circular saw, driven by foot or other power, and is so made that it diminishes in thickness from its periphery toward its center, thereby doing away with the necessity for setting the teeth of the same, and whereby a much smoother cut is possible. B B′ are adjustable vises or clamps, being composed of two principal parts or jaws, $a$ and $d$, each having a jaw or abutment, one part sliding upon the other, as clearly shown in Fig. 2, and by which the molding is rigidly held when required. These clamps are attached to the reciprocating table-top G in such a manner that they may be adjusted at different angles to the plane of the saw A by swinging them upon pivots, about which, as centers, the said clamps describe arcs of circles, and this adjustment permits the molding to be presented to the saw so that it may be cut at any desired angle.

Another motion that can be given to the said vises or clamps is a reciprocal movement of one jaw, $a$, toward or away from the saw without changing the angle of inclination to the saw, while the space between the jaws $a$ and $d$ is thereby diminished or increased, according to the width of the molding operated on.

What may be designated as a third motion is in the same direction as the last described, and is supplemental thereto—the one being used as a rapid approximate adjustment by the direct pressure of the hand, while the other is accomplished by the use of eccentric or cam levers $m$, one to each clamp, which give the jaws an exceedingly firm hold upon the molding to be operated on.

Another part of each vise or clamp consists of a perpendicular adjustable slide, $b$, let into the face of the supplemental portion $g$ of the reciprocating part $a$ of each vise or clamp, as shown in Fig. 2. The slides $b$ are each provided with a small projection, $q$ at their lower extremities, upon which the back of the molding is supported, the dotted lines in Fig. 2 showing the manner in which such molding is supported.

These slides, being adjustable to all depths of rabbet, enable the workman to operate upon two pieces of molding at the same time, if one projects below the other—as, for instance, the gilt lining of a picture-frame.

The movement of the reciprocating parts or jaws $a\ d$ of the clamps B B′ is free when the lever-nuts $o$ are slightly loosened; but when the said lever-nuts are tightened by a quarter-revolution, a firm fulcrum is furnished to the eccentric or cam levers $m$, which force the supplemental portions against the material operated on.

C is a hollow mandrel, revolving in bearings attached to the clamp B, and receives a rapid rotary motion from a belt, and its office is twofold—to wit, for actuating a boring-tool, and also, at another time, a hollow cutter. The use of the boring-tool is to make holes in the corners of frames, into which pins of wood moistened with glue are driven, to give additional strength to the joint when required. The use of the hollow cutter is to quickly make long slim cylinders of wood, which are afterward cut into pins of suitable lengths. The shank of the boring-tool is furnished with a longitudinal groove, in which a projecting pin on the inner circumference of the hollow mandrel fits and imparts motion to the tool.

By this arrangement the boring-tool may be moved back and forth when in rapid motion, by the hand, by means of a knob for that purpose at its outer end.

The boring-tool can be instantly removed when desired; and the rotation of the hollow mandrel may be stopped when it is not in use by removing the pressure of a tightener-pulley which stretches the belt operating it.

In the manufacture of picture-frames exact measurements are requisite, and it is absolutely necessary that the length of opposite sides shall be the same. To facilitate this operation I have attached to the base of the clamp or vise B a rule or measure, D, upon which inches and fractions thereof are indicated; and upon the bar E, attached to the reciprocating part or jaw a of the clamp B, is an adjustable stop, F. By aid of the rule D the required length is easily obtained, and an adjustment of the stop F assures an exact duplication of parts. This, in cases where many frames of the same dimensions are to be made, I consider very important, and it is very desirable where only one frame of a given size is to be made. Where the molding can be advantageously held in the clamps with the minor jaws thereof within the rabbet, a plain rule will answer all purposes, because the inside dimensions of a frame are always considered to be the size of the glass; but for certain reasons not necessary to specify, it is sometimes advisable to hold the molding with the minor jaws resting against the extreme inside edge, and in such cases a measurement by the plain rule, corresponding to the inside corner of the rabbet, would be erroneous. To provide against this, I make upon my said rule lines diagonal to the rule and parallel to the plane of the saw, by which lines measurements are made and error is avoided.

In order to make a smooth cut with a circular saw it is necessary that it shall run true, and not be easily deflected from its plane, and to this end it has been found necessary to use a saw of such thickness as to render its working by foot-power impracticable. A thin saw is operated with much less labor, and to steady its motion and prevent lateral movement of its periphery I provide a saw-guide, f, which is attached to the frame of the machine at the rear of the saw A, as shown in Fig. 3, and is adjustable, so that the forked portion shown at h, Figs. 1 and 3, may embrace almost any part of the periphery of the upper half of the saw. The bearings in the saw-guide are wooden pins screwed into holes in the forked portion h, and bear against the saw in the usual manner.

An important advantage secured by my machine is the facility with which the several pieces may be joined together to form the frame. This is accomplished by clamping within the vises or clamps B B' any two pieces to be joined, and they are there held so firmly that no slipping, during the operation of bradding or pinning, can occur.

When the fourth joint of a square frame is about to be made, the frame entirely incloses the saw, and should the joint prove to be imperfect, a forward movement of the table-top G causes the saw to enter the joint and correct the imperfection.

Having thus fully described my invention, what I claim as new, and desire to secure by Letters Patent, is—

1. The clamping devices B B', substantially as described, in combination with the circular saw A, all working in the manner described.

2. The hollow mandrel C, in combination with the clamping devices B B', operating as and for the purpose specified.

3. The bar E, carrying a sliding adjustable stop, F, in combination with the clamping device B and measure or rule D, for the purpose specified.

4. The clamping devices B B', constructed as shown and described, for holding the parts of a frame while the same are being joined together.

5. The perpendicular adjustable slide b in the face of the supplemental jaw of the clamping devices B B', for the purpose specified.

In testimony that I claim the foregoing as my own I affix my signature in presence of two witnesses.

WILLIAM E. EASTMAN.

Witnesses:
F. A. WISWELL,
GEORGE CADE.